United States Patent
Wolfthal

[11] 3,897,118
[45] July 29, 1975

[54] ANTI-FRICTION DIE SET
[75] Inventor: Maurice Wolfthal, Ossining, N.Y.
[73] Assignee: Stewart Stamping Corporation, Yonkers, N.Y.
[22] Filed: Oct. 15, 1973
[21] Appl. No.: 406,387

[52] U.S. Cl.......................... 308/4 C; 83/637; 184/5
[51] Int. Cl.² .......................................... F16C 1/26
[58] Field of Search......... 184/5, 100; 308/4 C, 6 B, 308/5 R; 83/22, 169, 613, 637

[56] References Cited
UNITED STATES PATENTS

| | | | |
|---|---|---|---|
| 1,729,898 | 10/1929 | Ruggles................. | 83/637 |
| 2,288,136 | 6/1942 | Janiszewski.......... | 308/5 R |
| 2,422,774 | 6/1947 | Conner................. | 308/4 C |
| 2,523,358 | 9/1950 | Conner................. | 308/4 C |
| 2,749,987 | 6/1956 | Janiszewski.......... | 308/5 R |
| 2,883,243 | 4/1959 | Whistler, Sr. et al...... | 83/637 |
| 3,602,081 | 8/1971 | Ballas.................. | 308/4 C |

Primary Examiner—Charles J. Myhre
Assistant Examiner—Daniel J. O'Connor
Attorney, Agent, or Firm—Darby & Darby

[57] ABSTRACT

An anti-friction die guide set includes a guide pin carried by the lower die plate and a bushing carried by the upper plate telescoping over the guide pin. An oil reservoir is provided at the base of the guide pin into which the lower end of the bushing may be immersed when the die plates are closest together, whereby oil is drawn into the bearing space between the pin and bushing during operation of the apparatus, the oil passing upwardly to the top of the pin. An interior passage is provided within the guide pin from its top to a point below the level of the oil within the reservoir, so that the oil which reaches the top of the guide pin enters the passage and is recirculated back into the reservoir. The passage also provides a convenient cavity into which a bearing ball may fall if it should have inadvertently worked free from a ball bearing cage, if used. The passage further provides a venting port for any air which may be compressed within the bushing during operation.

6 Claims, 5 Drawing Figures

ANTI-FRICTION DIE SET

BACKGROUND OF THE INVENTION

This invention relates generally to die guide sets and, more particularly, to improvements in self-lubricating die guide sets which include a guide pin and telescoping bushing.

Usual die press installations include opposed male and female dies mounted on respective die shoes or plates which are movable towards and away from each other. Clearly, in order to assure satisfactory operation, the opposed dies must be very accurately aligned relative to each other during movement. Additionally, the frictional forces created by the movement of the die plates should be kept to a minimum. The use of die guide sets including, in general, a guide pin mounted on the lower, fixed plate and a bushing mounted on the upper, movable die plate telescoping over the pin have been found to result in accurate alignment of the opposed dies. Lubrication of die guide sets of this type is necessary to reduce the friction between the moving parts and in some cases, serves to more precisely locate the pin within the bushing.

One arrangement for such lubrication includes the provision of an oil reservoir at the base of the guide pin. The bushing is adapted to become immersed within the oil when the die plates are in their most proximate position. The oil is drawn into the bearing space between the bushing and pin upon the die plates separating thereby lubricating this area. However, this manner of lubrication has not been found to be entirely satisfactory. The supply of oil contained within the reservoir is dissipated rather quickly since the lubricant drawn into the bearing space has been found to continuously move upwardly due to capillary action, among other reasons discussed below, eventually escaping out through an opening in the upper die member or merely building up in the upper portion of the die guide set. This depletion in oil reserve becomes acute when the supply is insufficient to adequately lubricate the die set since the increased frictional forces and generated heat may result in failure of the entire machine.

Another problem arises in the use of die guide sets of this type, i.e., telescoping guide pins and bushings, when additional anti-friction apparatus is provided in the bearing space between the guide pin and bushing. Such apparatus has in some cases taken the form of a cylindrical bearing cage or retainer housing a plurality of ball bearings which mutually engage the inner wall of the bushing and the outer surface of the guide pin. The bearing cage is movable longitudinally and during operation of the die guide set frequently moves to a position where some bearings are positioned over the top of the guide pin. If a bearing ball inadvertently becomes loose and drops into the space between the top of guide pin and the upper portion of the bushing the die set may jam.

SUMMARY OF THE INVENTION

Accordingly, one object of this invention is to provide a new and improved self-lubricated die guide set.

Another object of the invention is the provision of a new and improved die guide set having a recirculating lubricating system.

Still another object of the present invention is to provide a die guide set which will not jam or be otherwise deleteriously affected should a bearing ball inadvertently free itself from its retainer and fall over the guide pin.

Briefly, in accordance with the preferred embodiment of this invention, these and other objects are obtained by providing a lubricant reservoir at the base of a guide pin mounted on a die plate in telescopic relation with a bushing mounted on the complementary, opposed die plate. A lubricant return passage is formed within the guide pin from its free end to a point proximate to the lubricant reservoir. During operation, the free end of the bushing is immersed into the oil reservoir and a coating of oil is drawn upwardly into the space between the bushing and the pin. Upon reaching the free end of the guide pin, the oil enters the return passage and returns within the guide pin to the reservoir. The passage also serves to provide an area into which bearing balls may enter should they inadvertently become free from the cage in which they are normally held. Further, the return passage provides an air relief in cases where, for example, the die press ram completely covers the die plate which carries the bushing, which may result in the pin acting as a piston to compress the air within the bushing.

DESCRIPTION OF THE DRAWINGS

A more complete appreciation of the invention and many of the attendant advantages thereof will be more readily appreciated by reference to the accompanying drawings in which.

DESCRIPTION OF A PREFERRED EMBODIMENT

Figure 1:
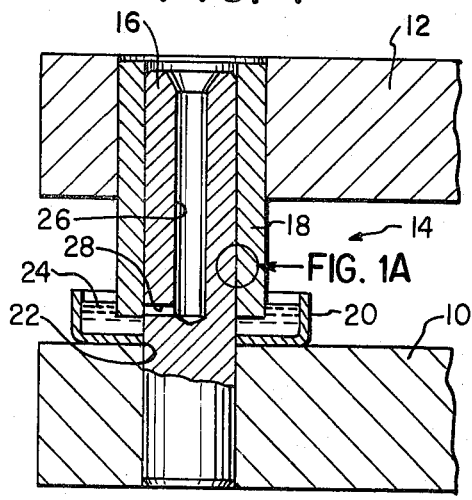
FIG. 1 is a front elevation in section of a die set according to the present invention, with the die plates in closed position.

Referring now to the drawings (where like reference characters designate identical or corresponding parts throughout the several views) and more particularly to FIG. 1 thereof, a portion of a die press installation including a die guide set according to the present invention is shown, including a lower die plate or shoe 10 which usually supports the female die cavity and an upper die plate or shoe 12 which supports the mating male die in opposed relationship. It is understood that only one of several die guide sets utilized on the die press is shown in the figures. The upper die plate is usually adapted to be movable towards and away from the lower die plate 10.

Figure 2:
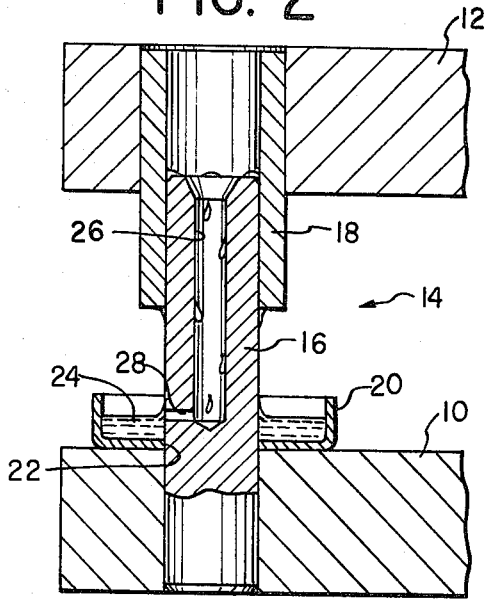
FIG. 2 is a view similar to FIG. 1 wherein the die plates have moved apart relative to their position shown in FIG. 1.

Very close tolerances must be maintained between the die members in order to produce a quality product. In order to maintain close tolerances during operation of the die press, die guide sets comprising guide pins and bushings are used. Turning to FIGS. 1 and 2, the die guide set, generally denoted as 14, includes a guide pin 16 mounted in and extending upwardly from the lower die plate 10, and a bushing 18 mounted in and extending downwardly from the upper die plate 12 in telescopic relation with the guide pin 16. In order to minimize the lateral "play" between the upper and lower die plates, it is desirable to decrease the clearance between the inner wall of bushing 18 and the outer surface of guide pin 16. However, as the clearance is minimized, the need for efficient lubrication increases accordingly to prevent friction and a buildup of heat which will cause excessive wear, etc. Referring to FIGS. 1 and 2, a cup-shaped container 20 is provided around guide pin 16, the pin passing through a central opening 22 formed in the bottom of container 20. The container is preferably located adjacent to the upper surface of lower die plate 10 but may be positioned elsewhere along the length of the pin. A conventional seal (not shown) is provided at the mating edges of the container and pin so that the container can be filled with and define an oil reservoir 24.

Figure 1A:
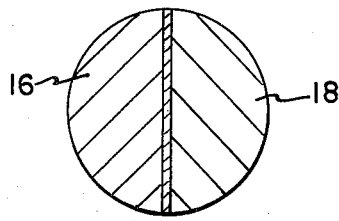
FIG. 1a is a partial view of FIG. 1 greatly magnified showing the bearing area between the pin and bushing.

When the die plates 10, 12 are closest to each other (FIG. 1) the lower end of bushing 18 is immersed in the oil. As the plates move away from each other (FIG. 2) the oil is drawn up into the area (FIG. 1a) between the bushing and the guide pin thereby lubricating the bearing surfaces. It has been found that once drawn into the area between the pin and bushing, the oil actually travels upwardly relative to the pin. This travel apparently is the result of a number of factors. The oil adheres to the bushing and is "dragged" up the side of the pin by the bushing as it moves outwardly. Additionally, in most die presses, the die plates move toward each other at a greater rate than they move apart. Thus, as the oil is slowly drawn up the pin, the fast downward motion of the bushing prevents the oil from running too far back down the pin. Further, the small clearance between the walls defining the bearing area causes that area to act as a capillary passage so that the oil flows upwardly due to capillary action.

In prior apparatus, the upward movement of the oil over the guide pin results in the dissipation of oil from the reservoir which constitutes a severe disadvantage in the operation of the press since the frequency of periodic maintenance is increased. In order to obviate the disadvantage, the present invention provides a recirculation system for the oil. Such recirculation lessens the rate at which the oil is dissipated from the reservoir thereby reducing the risk of damaging the equipment due to insufficient oil supply and further reducing lost time in replenishing the oil reservoirs. Towards this end, an axial bore 26 is formed through guide pin 16 having a flared mouth at the upper free end of the pin and terminating in a horizontal plane just above the lower surface of the container 20. A radial bore 28 communicates with the inner terminal end of bore 26 opening to the exterior of pin 16 into the interior of the oil reservoir.

Referring to FIGS. 1 and 2, in operation, the die plates move toward each other and finally reach the position shown in FIG. 1 where the lower end of bushing 18 is immersed in the oil reservoir after the article is formed. The plates begin to move apart finally reaching the position of FIG. 2. As the motions are repeated, oil is drawn into the bearing space and moves upwardly on the pin due to the conditions described above. The oil eventually reaches the top of guide pin 16 and flows into and down bore 26 and thence out through horizontal bore 28 back into lubricant reservoir 20.

Thus, the supply of lubricant is being continuously replenished during operation of the die guide set thereby preventing excessive wear and/or failure due to loss of lubricant. As is clear from the above description, the recirculation arrangement is quite simple and requires no extra equipment such as springs, pumps, etc. Due to its relative simplicity, the recirculation system is inexpensive to manufacture and since no moving parts are utilized, there is little possibility of the system failing to operate. However, it is emphasized that although the apparatus is relatively uncomplicated, it has been found that the effectiveness of the lubrication is increased to an unusual extent. A fine mesh screen may be positioned in the flared mouth of the bore 26 in order to filter any metal filings or other dirt from the oil moving up through the bearing area before entering into the return passage.

Figure 3:
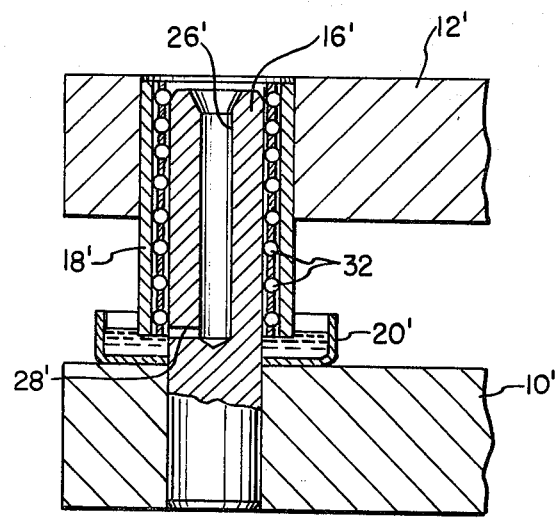
FIG. 3 is a front elevation in section of a die set according to the present invention including a ball bearing cage and with the die plates in closed position.
Figure 4:
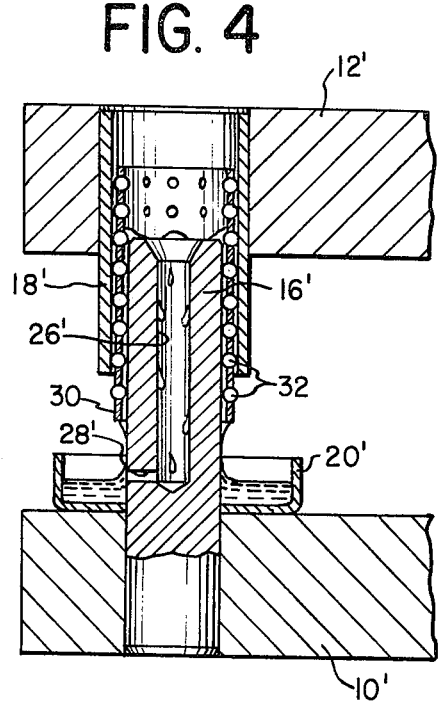
FIG. 4 is a view similar to FIG. 3 wherein the die plates have moved apart relative to their position in FIG. 3.

Turning to FIGS. 3 and 4, a die guide set somewhat similar to the one illustrated in FIGS. 1 and 2 is illustrated. Those elements of the apparatus shown in FIGS. 3 and 4 corresponding to elements of the FIGS. 1 and 2 apparatus are given the same numeral, but primed. In this die guide set, a ball bearing cage 30 is provided in the bearing space between the bushing 18' and the guide pin 16', to further reduce friction. The cage comprises a cylindrical member housing a plurality of bearing balls 32 along its entire height.

As seen in FIGS. 3 and 4, as the upper die member 12' reciprocates up and down, the bearing cage 30 also reciprocates although not with the same amplitude as bushing 18'. As seen in FIG. 4, at its highest point, the upper end portion 34 of the bearing cage extends over the top of guide pin 16'. It has not been uncommon for balls housed in this upper end portion 34 to become loose and inadvertently fall from the cage. In the past, the balls, once loose, would be caught between the pin and ram, possibly resulting in serious damage. The lubrication system of the present invention, and more particularly, the bore 26' forming part of the system, provides a convenient area into which any loose balls may fall. In all other respects, the lubrication system when used in a die guide set having a bearing cage acts in a manner similar to that where no bearing cage is used. In this case, both the bushing 18' and the bearing cage 30 dip into the lubricant within reservoir 20', and the lubricant is "dragged" into the bearing space between the bushing and the guide pin as in the prior case. All the advantages inherent in the cageless embodiment are also present in the caged embodiment.

Still another advantage inures from the provision of the recirculation system of the present invention. Modern press rams usually cover the top of the die plate which carries the bushing in which the guide pin rides. When the die set closes, the guide pin acts as a piston within the bushing, which, in such a die set would create a high pressure condition within the die set having potential destructive capabilities. One attempt to solve this problem included providing a hole in the ram above the die set. However, this resulted in a loss of lubricant since the air compressed by the die movement forced lubricant out from that hole. The present invention, however, provides a convenient air relief through bore 26 and 28 thereby obviating that problem.

While the invention has been described with respect to preferred embodiments, obviously numerous modifications may be made in light of the above disclosure while still following the basic principles of the invention. For example, the bore may have a different configuration than that shown, e.g., non-axial and slanted or a combination of cooperating bores. It is to be understood that within the scope of the appended claims the invention may be practiced otherwise than as specifically described herein.

What is claimed is:

1. In a die press including a pair of die members movable toward and away from each other, the assembly comprising a pin fixed to the lower one of said die members and a bushing fixed to the upper one of said die members in telescopic relation with said pin, a lubricant reservoir surrounding said pin adjacent the one end thereof and adapted to contain a fluid lubricant, the pin and bushing being located so that one end of said bushing is within said lubricant when said die members are closest to each other, said pin having an unimpeded passage formed therethrough, one end thereof opening into the free end of said pin and the other end thereof opening into said reservoir, said lubricant tending to move upwardly between said pin and said bushing, to enter said one end of said passage, to move downwardly through said passage, and to exit therefrom into said reservoir by action of said pin and bushing telescopically reciprocating relative to each other.

2. The assembly as recited in claim 1 wherein said passage comprises a bore formed axially within said pin, one end of said axial bore opening from the free end of said pin and the other bore end terminating within said pin below the plane containing the upper edge of said reservoir, and a radial bore formed within said pin, one end of said radial bore opening into said reservoir and the other end communicating with said other end of said axial bore.

3. The assembly as recited in claim 1 further comprising an anti-friction bearing positioned between said pin and said bushing for reducing friction between said pin and said bushing.

4. A die guide set including a vertically mounted lower leader pin, an upper guide bushing telescopically associated around said leader pin, an anti-friction bearing positioned between said leader pin and said guide bushing for reducing friction between said pin and said guide bushing, said bearing including a longitudinally movable frame housing a plurality of bearing surfaces, said pin having an interior passaged formed therethrough having one end opening from the top edge surface of said pin, said passage extending at least partially within and along the length of said pin, a lubricant reservoir mounted around said pin, said pin and bushing being located so that the free end of said bushing is adapted to be within said lubricant reservoir at intervals during operation of the die guide set whereby a coating of lubricant is adapted to be applied between said pin and said bushing, said interior passage extending through said pin and having its other end opening into said reservoir defining an unimpeded passage through said pin.

5. A die guide set including a vertically mounted lower leader pin, an upper guide bushing telescopically associated around said leader pin, an anti-friction bearing positioned between said leader pin and said guide bushing for reducing friction between said pin and said guide bushing, said bearing including a longitudinally movable frame housing a plurality of bearing balls, at least one of said bearing balls extending about the top edge surface of said pin at intervals during operation of the die guide set, said pin having an interior bore formed therethrough having a diameter larger than the diameter of any one of said bearing balls, said bore extending at least partially within and along the length of said pin and opening from the top edge surface thereof.

6. A die guide set as recited in claim 5 wherein said open end of said passage is enlarged and said upper edge of said leader pin is beveled thereby facilitating the entrance into said passage of any of said bearing balls which inadvertently escape from said frame.

* * * * *